US011405777B2

(12) United States Patent
Laselva et al.

(10) Patent No.: US 11,405,777 B2
(45) Date of Patent: Aug. 2, 2022

(54) METHOD AND APPARATUS FOR CONTROLLING A CIPHERING MODE

(71) Applicant: NOKIA SOLUTIONS AND NETWORKS OY, Espoo (FI)

(72) Inventors: Daniela Laselva, Klarup (DK); Suresh Nair, Whippany, NJ (US); Krzysztof Kordybach, Plawy (PL)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 633 days.

(21) Appl. No.: 16/318,032

(22) PCT Filed: Jul. 15, 2016

(86) PCT No.: PCT/US2016/042584
§ 371 (c)(1),
(2) Date: Jan. 15, 2019

(87) PCT Pub. No.: WO2018/013139
PCT Pub. Date: Jan. 18, 2018

(65) Prior Publication Data
US 2021/0289362 A1 Sep. 16, 2021

(51) Int. Cl.
*H04L 29/06* (2006.01)
*H04W 12/033* (2021.01)
(Continued)

(52) U.S. Cl.
CPC ....... *H04W 12/033* (2021.01); *H04W 12/037* (2021.01); *H04W 28/0252* (2013.01);
(Continued)

(58) Field of Classification Search
CPC ............... H04W 12/66; H04W 12/033; H04W 128/0252; H04W 84/12
(Continued)

(56) References Cited

U.S. PATENT DOCUMENTS 8,824,298 B2   9/2014  Gupta et al.
8,855,313 B2   10/2014 Kumoluyi et al.
(Continued)

FOREIGN PATENT DOCUMENTS

| EP | 2611227 A1 | 7/2013 |
| WO | WO 2016/018012 A1 | 2/2016 |
| WO | WO 2016/074707 A1 | 5/2016 |

OTHER PUBLICATIONS

Dec. 12, 2019 Extended Search Report issued in European Patent Application No. 16909032.1.
(Continued)

*Primary Examiner* — Evans Desrosiers
(74) *Attorney, Agent, or Firm* — Squire Patton Boggs (US) LLP (57) ABSTRACT

A method and apparatus may include configuring, by a network node, a user equipment to use an aggregation of radio technologies. At least one radio bearer is established between the user equipment and the network node and is routed over an access point of an alternate wireless network. The method may also include determining whether trustworthy security is provided by the access point of the alternate wireless network. The method may also include instructing the user equipment to turn off ciphering based on the determining, wherein the ciphering is turned off for the at least one radio bearer between the user equipment and the apparatus. The method may also be used for configuring specific ciphering on selective radio bearers.

15 Claims, 6 Drawing Sheets

(51) Int. Cl.
*H04W 12/037* (2021.01)
*H04W 28/02* (2009.01)
*H04W 12/60* (2021.01)
*H04W 12/67* (2021.01)
*H04W 84/12* (2009.01)
*H04W 88/06* (2009.01)

(52) U.S. Cl.
CPC ............ *H04W 12/66* (2021.01); *H04W 12/67* (2021.01); *H04W 84/12* (2013.01); *H04W 88/06* (2013.01)

(58) Field of Classification Search
USPC .............................................................. 726/3
See application file for complete search history.

(56) References Cited

U.S. PATENT DOCUMENTS

| | | | |
|---|---|---|---|
| 2008/0004009 A1* | 1/2008 | Caldwell | H04L 61/1588 455/434 |
| 2011/0222523 A1 | 9/2011 | Fu et al. | |
| 2012/0284785 A1 | 11/2012 | Salkintzis et al. | |
| 2013/0236016 A1* | 9/2013 | Zhang | H04W 12/037 380/270 |
| 2016/0174107 A1 | 6/2016 | Kanugovi et al. | |
| 2016/0234847 A1* | 8/2016 | Zhang | H04W 60/02 |

OTHER PUBLICATIONS

Broadcom Corporation: "User Plane Architecture solutions based on DuCo Solution 2C", 3GPP Draft; R2-153724 UP_SOLUTIONS_FOR_2C, 3rd Generation Partnership Prokect (3GPP), Mobile Competence Centre; 650, Route Des Lucioles; F-06921 Sophia-Antipolis Cedex; France.

Intel Corporation: "User plane aspects of LWA support for high data rate 802.11 technologies", 3GPP Draft; R2-162462-ELWA-USER-PLANE-ASPECTS-V2, 3rd Generation Partnership Project (3GPP), Mobile Competence Centre; 650, Route Des Lucioles; F-06921 Sophia-Antipolis Cedex; France.

Intel Corporation: "Rel 14—LWA optimization to support high data rate 802.11 technologies", 3GPP Draft; S3-160511-REL-SECURITY-OPT, 3rd Generation Partnership Prokect (3GPP), Mobile Competence Centre; 650, Route Des Lucioles; F-06921 Sophia-Antipolis Cedex; France.

International Search Report & Written Opinion dated Oct. 7, 2016 corresponding to International Patent Application No. PCT/US2016/042584.

* cited by examiner

METHOD AND APPARATUS FOR CONTROLLING A CIPHERING MODE

BACKGROUND

Field

Certain embodiments of the present invention relate to controlling a ciphering mode for LTE-WLAN aggregation.

Description of the Related Art

Long-term Evolution (LTE) is a standard for wireless communication that seeks to provide improved speed and capacity for wireless communications by using new modulation/signal processing techniques. The standard was proposed by the 3$^{rd}$ Generation Partnership Project (3GPP), and is based upon previous network technologies. Since its inception, LTE has seen extensive deployment in a wide variety of contexts involving the communication of data.

SUMMARY

According to a first embodiment, a method can include configuring, by a network node, a user equipment to use an aggregation of radio technologies. At least one radio bearer is established between the user equipment and the network node and is routed over an access point of an alternate wireless network. The method can also include determining whether trustworthy security is provided by the access point of the alternate wireless network. The method can also include instructing the user equipment to turn off ciphering based on the determining. The ciphering is turned off for the at least one radio bearer between the user equipment and the network node.

In the method of the first embodiment, the network node comprises an evolved Node B.

In the method of the first embodiment, wherein the access point comprises an access point of a Wireless-Local_Area-Network (WLAN) defined by IEEE802.11 series, a 5G radio access point defined by 3GPP, and/or a Bluetooth radio point.

In the method of the first embodiment, the determining whether trustworthy security is provided by the access point comprises determining whether adequate ciphering is provided between the access point and the user equipment.

In the method of the first embodiment, the determining whether trustworthy security is provided by the access point comprises determining whether adequate ciphering is provided between the access point and the WLAN termination.

In the method of the first embodiment, instructing the user equipment to turn off ciphering comprises indicating a NULL encryption (EEA0) algorithm choice to the user equipment.

In the method of the first embodiment, instructing the user equipment to turn off ciphering based on the determining comprises turning off ciphering for the at least one radio bearer or part of the at least one radio bearer, while continuing security procedures for other radio bearers without change.

In the method of the first embodiment, instructing the user equipment to turn off ciphering comprises instructing the user equipment to turn off packet-data-convergence-protocol ciphering.

In the method of the first embodiment, the method also includes exchanging information regarding whether the access point is trustworthy, wherein the exchanged information indicates at least one of an identifier of the access point, an ownership of the access point, a type of access authentication of the access point, and an encryption used by the access point.

According to a second embodiment, an apparatus can include configuring means to configure a user equipment to use an aggregation of radio technologies. At least one radio bearer is established between the user equipment and the apparatus and is routed over an access point of an alternate wireless network. The apparatus can also include determining means to determine whether trustworthy security is provided by the access point of the alternate wireless network. The apparatus can also include instructing means to instruct the user equipment to turn off ciphering based on the determining. The ciphering is turned off for the at least one radio bearer between the user equipment and the apparatus.

In the apparatus of the second embodiment, the apparatus comprises an evolved Node B.

In the apparatus of the second embodiment, wherein the access point comprises an access point of a Wireless-Local_Area-Network (WLAN) defined by IEEE802.11 series, a 5G radio access point defined by 3GPP, and/or a Bluetooth radio point.

In the apparatus of the second embodiment, the determining whether trustworthy security is provided by the access point comprises determining whether adequate ciphering is provided between the access point and the user equipment.

In the apparatus of the second embodiment, the determining whether trustworthy security is provided by the access point comprises determining whether adequate ciphering is provided between the access point and the WLAN termination.

In the apparatus of the second embodiment, instructing the user equipment to turn off ciphering comprises indicating an NULL encryption (EEA0) algorithm choice to the user equipment.

In the apparatus of the second embodiment, instructing the user equipment to turn off ciphering based on the determining comprises turning off ciphering for the at least one radio bearer or part of the at least one radio bearer, while continuing security procedures for other radio bearers without change.

In the apparatus of the second embodiment, instructing the user equipment to turn off ciphering comprises instructing the user equipment to turn off packet-data-convergence-protocol ciphering.

In the apparatus of the second embodiment, the apparatus also includes an exchanging means to exchange information regarding whether the access point is trustworthy, wherein the exchanged information indicates at least one of an identifier of the access point, an ownership of the access point, a type of access authentication of the access point, and an encryption used by the access point.

According to a third embodiment, a computer program product can be embodied on a non-transitory computer readable medium. The computer program product can be configured to control a processor to perform a method. The method includes configuring, by a network node, a user equipment to use an aggregation of radio technologies. At least one radio bearer is established between the user equipment and the network node and is routed over an access point of an alternate wireless network. The method can also include determining whether trustworthy security is provided by the access point of the alternate wireless network. The method can also include instructing the user equipment to turn off ciphering based on the determining. The ciphering is turned off for the at least one radio bearer between the user equipment and the network node.

In the computer program product of the third embodiment, the network node comprises an evolved Node B.

In the computer program product of the third embodiment, the access point comprises an access point of a Wireless-Local_Area-Network (WLAN) defined by IEEE802.11 series, a 5G radio access point defined by 3GPP, and/or a Bluetooth radio point.

In the computer program product of the third embodiment, the determining whether trustworthy security is provided by the access point comprises determining whether adequate ciphering is provided between the access point and the user equipment.

In the computer program product of the third embodiment, the determining whether trustworthy security is provided by the access point comprises determining whether adequate ciphering is provided between the access point and a WLAN termination.

In the computer program product of the third embodiment, instructing the user equipment to turn off ciphering comprises indicating a NULL encryption (EEA0) algorithm choice to the user equipment.

In the computer program product of the third embodiment, instructing the user equipment to turn off ciphering based on the determining comprises turning off ciphering for the at least one radio bearer or part of the at least one radio bearer, while continuing security procedures for other radio bearers without change.

In the computer program product of the third embodiment, instructing the user equipment to turn off ciphering comprises instructing the user equipment to turn off packet-data-convergence-protocol ciphering.

In the computer program product of the third embodiment, the method also includes exchanging information regarding whether the access point is trustworthy, wherein the exchanged information indicates at least one of an identifier of the access point, an ownership of the access point, a type of access authentication of the access point, and an encryption used by the access point.

According to a fourth embodiment, a method can include determining, by a network node, a radio bearer. The method can also include indicating an encryption algorithm to the determined radio bearer, wherein the indicating comprises instructing the determined radio bearer to use the indicated encryption algorithm, while continuing common security procedures for other radio bearers without change.

According to a fifth embodiment, an apparatus can include determining means to determine a radio bearer. The apparatus can also include indicating means to indicate an encryption algorithm to the determined radio bearer, wherein the indicating comprises instructing the determined radio bearer to use the indicated encryption algorithm, while continuing common security procedures for other radio bearers without change.

According to a sixth embodiment, a computer program product can be embodied on a non-transitory computer readable medium. The computer program product can be configured to control a processor to perform a method. The method can include determining, by a network node, a radio bearer. The method can also include indicating an encryption algorithm to the determined radio bearer. The indicating comprises instructing the determined radio bearer to use the indicated encryption algorithm, while continuing common security procedures for other radio bearers without change.

According to a seventh embodiment, an apparatus can include at least one processor. The apparatus can also include at least one memory including computer program code. The at least one memory and the computer program code can be configured, with the at least one processor, to cause the apparatus at least to configure a user equipment to use an aggregation of radio technologies. At least one radio bearer is established between the user equipment and the apparatus and is routed over an access point of an alternate wireless network. The apparatus can also be caused to determine whether trustworthy security is provided by the access point of the alternate wireless network. The apparatus can also be caused to instruct the user equipment to turn off ciphering based on the determining. The ciphering is turned off for the at least one radio bearer between the user equipment and the apparatus.

According to an eighth embodiment, an apparatus can include at least one processor. The apparatus can also include at least one memory including computer program code. The at least one memory and the computer program code can be configured, with the at least one processor, to cause the apparatus at least to determine a radio bearer. The apparatus can also be caused to indicate an encryption algorithm to the determined radio bearer, wherein the indicating comprises instructing the determined radio bearer to use the indicated encryption algorithm, while continuing common security procedures for other radio bearers without change.

BRIEF DESCRIPTION OF THE DRAWINGS

For proper understanding of the invention, reference should be made to the accompanying drawings, wherein.

DETAILED DESCRIPTION

Certain embodiments of the present invention relate to controlling a ciphering mode for Long-Term-Evolution and Wireless-Local-Area-Network Aggregation (LWA). Although LTE and WLAN aggregation is specifically mentioned, other embodiments may aggregate other radio technologies, such as aggregation with 5G technologies and/or Bluetooth technologies, for example. The features of LWA enable a user equipment to implement dual connectivity with an eNB and with a Wireless Local Area Network (WLAN). With this dual connectivity, at least some of the user plane traffic may be routed to the user equipment (UE) via a WLAN access network. The WLAN access network can be connected to LTE via an interface. For example, the WLAN access network can be connected to LTE via an Xw interface that is terminated at a Wireless Termination (WT) node. As of Release 13, only downlink (DL) communication is enabled for LWA, but uplink (UL) communication is expected to be enabled in Release 14.

Certain embodiments of the present invention that implement LWA may assume control of an enhanced Node B (eNB), with respect to performing data exchange. With certain embodiments, the eNB decides if LWA is to be enabled (and, if LWA is to be enabled, the eNB can configure a UE to use LWA). The eNB also decides which data/services are to be set up over WLAN, and the eNB may also decide which access points (APs) are to be involved in the transmissions of the data exchange. The list of the APs that the UE may roam among can be considered to be a WLAN Mobility Set. Also, with certain embodiments, the eNB can act as a termination point for flow control.

Some aspects of the WLAN may be beyond the control of the eNB. In particular, the architecture of the WLAN network (that is behind the WT) may not be known by the eNB. Also, the specific implementation of the APs is not controllable by the eNB, as the WT represents the APs before the LTE network of the eNB.

With Release 13 LWA, 3GPP Technical Specification 33.401 indicates that IEEE 802.11 security mechanisms are to be used to protect WLAN communication, where the WLAN communication is established between a WLAN AP and a UE. These security mechanisms can perform authentication and radio link encryption. Data encryption can be performed at a Packet Data Convergence Protocol (PDCP) layer.

Ciphering generally refers to a method for encrypting or decrypting data.

Currently there is dual ciphering performed for LWA traffic that is served over WLAN because of the architecture. There is PDCP layer ciphering between the PDCP layer at the eNB and the PDCP layer in the UE. In addition, there is ciphering of the same data packets when they go over the WLAN air interface between the UE and the WLAN AP. Providing support for high-data-rate WLAN technologies is one agreed-upon target among the agreed targets of Release 14. At the last RAN2 meeting, there were proposals to reduce a PDCP ciphering processing load, and there were proposals to help the UE to sustain a high rate of data by not using PDCP ciphering for packet data units (PDUs) that belong to LWA bearers which are sent over WLAN.

Certain embodiments of the present invention may reduce a PDCP processing load by utilizing a mode that reduces the performing of ciphering. For example, certain embodiments may utilize a "no-PDCP ciphering" mode. As described in more detail below, a no-PDCP ciphering mode can, for example, turn off ciphering/PDCP encryption at the PDCP layer for WLAN communication that is trusted.

With certain embodiments, a no-PDCP ciphering mode can be used if the eNB is able to ensure that adequate ciphering (corresponding to the ciphering of LTE) has been provided between the eNB and the UE. Since the same UE is served by the eNB over a LTE link and a WLAN link simultaneously, the eNB has to ensure that the security available on both links are equal. The eNB can make a determination regarding whether adequate ciphering is employed by the WLAN AP, provided eNB has the information on the authentication scheme and ciphering algorithm chosen on the WLAN air interface, and provided the eNB has knowledge of a strength of this algorithm such as whether the algorithm is 64 bit vs 128 bit, etc. Currently, the "no-PDCP" ciphering mode is not applied to WLAN APs, even in the event that the WLAN APs are trusted by the mobile operator. Currently, both encryption at the PDCP layer and encryption at the WLAN layer will occur. Certain WLAN APs may be considered to be secure if they apply/provide strong WLAN security methods of authentication and ciphering. Generally, a WLAN that is hosted/controlled by an AP of the mobile operator is typically trusted to provide adequate ciphering, while APs that are hosted/controlled by third parties are assumed to be untrustworthy in providing adequate ciphering. In a general network topology, a same WT may control both groups of trusted APs and untrusted APs.

As the eNB has to ensure that adequate ciphering (i.e., ciphering that corresponds to the ciphering of LTE) is provided between the eNB and the UE, certain embodiments of the present invention are directed to determining when applying PDCP encryption is not necessary. In other words, certain embodiments do not apply PDCP encryption when WLAN offers sufficient encryption. In order to determine whether PDCP encryption is necessary, the eNB may need to determine the current level of WLAN security.

The eNB may provide information that is needed to activate WLAN security (in the event that eNB-based authentication is adopted for LWA). The WLAN security may be based on accepted and strong algorithms. However, because the implementation of WLAN APs may be beyond a mobile operator's authority, certain risks may exist. For example, the software used by certain commercial APs may possibly not be well-verified. As such, certain technical bugs within the software of these APs may allow unauthorized access to a root of a router shell. If such exploitable bugs are present in software/firmware that is used in LWA APs, such exploitable bugs could expose the user equipment's traffic to hackers. As such, it may be important to determine whether an AP has been properly verified/examined. It may also be important to determine whether the mobile operator can take responsibility for a given AP's proper functioning.

The 3GPP standard defines two types of WLAN access: (1) a trusted (secure) type of access, and (2) an untrusted (open) type of access. The WLAN access has to be trusted to interwork tightly with LTE. However, 3GPP does not specify which WLANs should be considered as being trusted and which WLANs should be untrusted.

The decision of trustworthiness may be left up to the mobile operator, based on the level of control over the WLAN network. The WLAN APs in the scope of LWA can be either hosted/controlled by the mobile operator or hosted/controlled by a 3rd party. 3rd party APs are typically considered to not be entirely trustworthy, as 3rd party APs are typically not fully known by the mobile operator.

For a LWA split bearer, a no-PDCP ciphering mode generally means that protocol data units (PDUs) that are transmitted via the LTE link are ciphered at the eNB PDCP layer, and these PDUs need to be deciphered properly at the receiving UE PDCP layer, while PDUs that are transmitted via the WLAN link are not ciphered at the eNB PDCP layer and not deciphered at the receiving UE PDCP layer. So, certain embodiments of the present invention may determine how to stop PDCP ciphering for radio bearers that are aggregated over the WLAN path, while maintaining ciphering for regular radio bearers that are over the LTE air path. Currently, all the radio bearers are either ciphered or not ciphered based on a negotiation between the eNB and the UE, typically during an initial attach process. The negotiated ciphering algorithm is applied to all radio bearers that are subsequently established later on via a Security Mode Command from the eNB to the UE. To stop ciphering on selected radio bearers, which are going over the WT/AP path, the framework of the current approaches has to change.

According to certain embodiments, the following steps may be performed. A UE may transmit capability indication of NULL encryption (EEA0) algorithm to the eNB during an Initial attach procedure. The eNB can make use of this information later on to determine whether the UE is capable of stopping PDCP ciphering in support for LWA. The eNB can determine whether the eNB trusts the WLAN/AP based on WLAN/AP encryption/security information provided by the WT. WT is generally understood as a WLAN Termination point defined by 3GPP for LWA. The eNB communicates with the WT, and the WT is a 3GPP entity. WT, in turn, may be a WLAN controller, controlling many APs. The WLAN/AP encryption/security information may be associated with one or several APs reported from the WT to the eNB. For example, each AP may be reported from the WT to the eNB using a WLAN ID. The WLAN/AP encryption/security information may be provided from the WT as a response to a request from the eNB. The WLAN/AP encryption/security information may be associated with the WT response to the LWA bearer setup request from the eNB (i.e., the WT provides the information if a mobility set indicated by the eNB is trusted/untrusted). The WLAN/AP encryption/security information may be connected to the WT's acceptance of a LWA bearer setup request from the eNB (i.e., where the WT accepts or rejects the request which contains trusted status along with the Mobility Set). The WLAN/AP encryption/security information may be provided as a part of 3GPP Operation-Administration-Management-based information exchange.

If the UE supports NULL encryption (EEA0) algorithm, and if the eNB has received the WLAN/AP encryption information from the WT, and if the eNB trusts the WLAN/AP, then for LWA bearers, when the data radio bearer (DRB) is established, in the RRC Reconfig message, the eNB will indicate to the UE to turn off ciphering, by including a EEA0 algorithm (NULL ciphering) choice (e.g.: in the 'PDCP-Config' IE/lwa-Config IE/lwa-MobilityConfig IE).

The UE may interpret this message as instructing that the PDCP layer decryption or encryption is/should be turned off (set to NULL encryption (EEA0) algorithm) for PDUs that are received/sent on this LWA DRB. On other RBs on the LTE link of this UE, the negotiated choice of algorithm and encryption using the Security Mode Command procedure continues to be used without any change.

A similar principle can be used for UL and DL radio bearers, when such LWA radio bearers are established on the WLAN link, where turning OFF the encryption/decryption is allowed on DRBs limited to the WLAN link. As such, a per RB algorithm negotiation is avoided between the UE and the eNB for LTE radio bearers and there are not too many changes in signalling (there is signalling only when a radio bearer is established in LWA).

Figure 1:
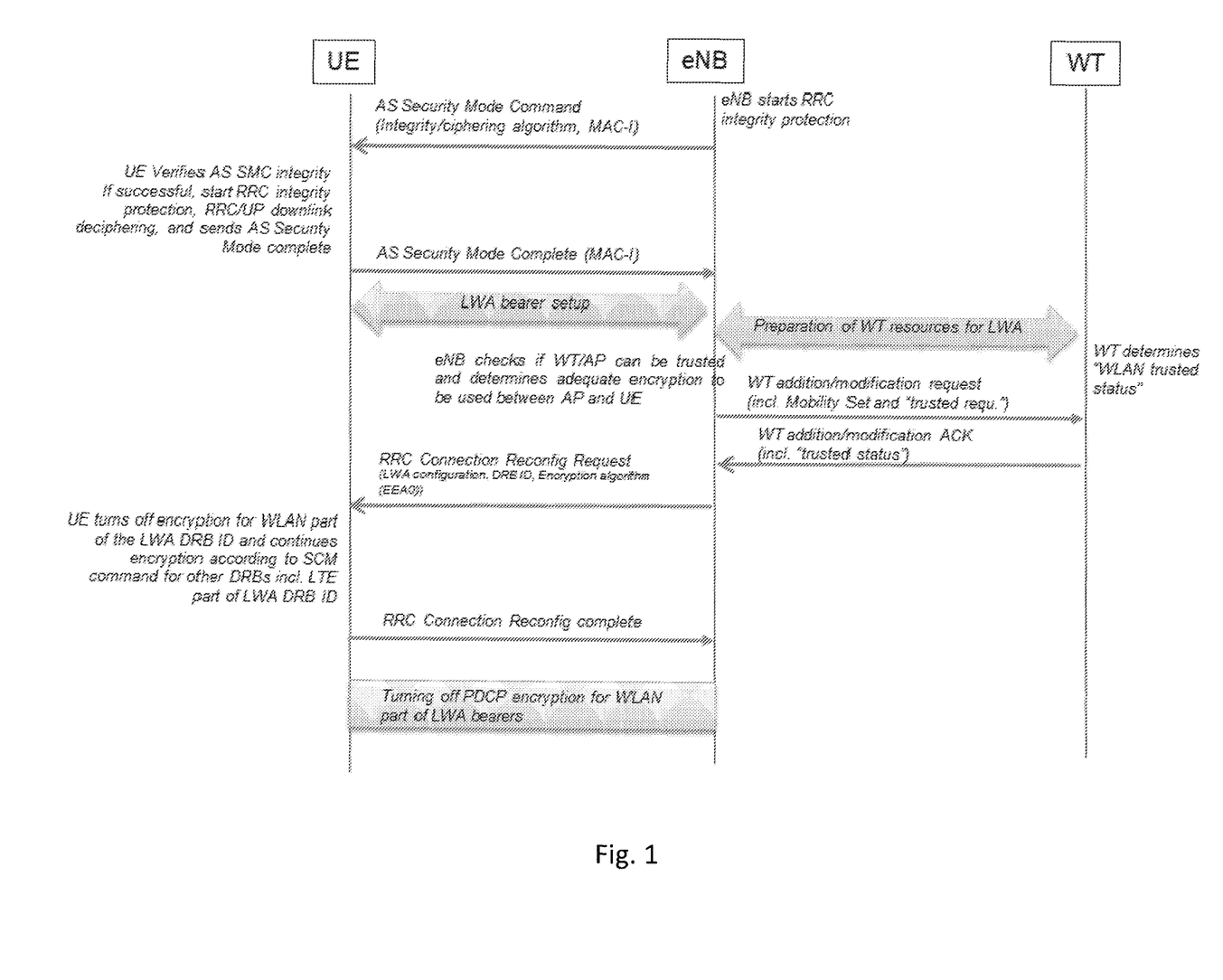
FIG. 1 illustrates different communication transmitted by certain embodiments of the present invention.

Certain embodiments of the present invention are illustrated in FIG. 1. With certain embodiments, the eNB indicates to the UE to turn OFF PDCP ciphering for a LWA radio bearer. The eNB may provide this indication to the UE during a step of setting up/modifying the LTE-WLAN Aggregation Data Radio Bearer (LWA DRB), by including an algorithm choice EEA0.

With certain embodiments, the eNB conveys the EEA0 (NULL) algorithm choice in the "PDCP-Config" information element (IE), or in the "lwa-Config" IE, along with the LWA radio bearer identifier. A no-ciphering mode is intended to be used during the lifetime of the bearer and is to be applied to any one WLAN AP, or in a lwa-MobilityConfig IE, which is used to configure the WLAN mobility set comprised of multiple APs. By using the latter signaling for WLAN mobility set using lwa-MobilityConfig IE, for example, the no-ciphering mode can be indicated to be used for at least a part of the WLAN Mobility Set. With certain embodiments, a no-ciphering mode can be changed to a ciphering ON-mode, when a new mobility set is provided.

For example, the ciphering mode can be changed to be ON if the new set includes one or more WLANs that are not trustworthy.

In another embodiment, the eNB may decide to turn OFF the PDCP ciphering by transmitting a message to the UE. The eNB may transmit the message by indicating an algorithm choice, NULL encryption (EEA0), if the eNB has sufficient information on the encryption between the UE and the WLAN/AP. In certain embodiments, the UE will interpret this received message as instructing the PDCP encryption to be turned off (set EEA0) only for the PDUs that are received/sent on the WLAN link of the LWA data radio bearer (DRB). On other RBs, as well as for the PDUs received on the LTE link of this LWA DRB, the negotiated choice of algorithm and encryption using the Security Mode Command procedure continues without any change.

In one embodiment, the WLAN Termination (WT) may identify one nor more WLANs using WLAN identifiers. The WT may use a WLAN identifier (ID) (e.g., a basic service set identification (BSSID)) that the WT reports (to the eNB) to indicate whether the WLAN is to be trusted or untrusted. This embodiment may be useful if differences in APs' security levels for a same WT can be expected.

In another embodiment, the eNB can instruct the WT about whether the trusted/untrusted WLAN operations are required as a part of the security information in the WT addition. With the bearer establishment/modification acknowledgment, the WT can confirm that the required security is provided by the WLAN APs in the Mobility Set (MS).

Another embodiment of the present invention may place the decision regarding whether the WLAN operations are to be trusted or untrusted upon the WT. The eNB can create any Mobility Set, and then the WT informs (in a response to an addition/modification message) if such a set of APs can be trusted or not.

In another embodiment, based on the WLAN trusted/untrusted information and the WLAN measurement report from the UE, the eNB determines if a no-PDCP ciphering mode can be used for a given UE.

In view of the above, certain embodiments of the present invention allow the eNB to know whether a WLAN security is trusted or untrusted, in order to determine whether or not to support the no-PDCP ciphering mode for a LWA-capable UE.

Certain embodiments allow PDCP encryption to be selectively turned off at the time of radio bearer creation for any bearer, irrespective of whether the bearer is an LWA bearer or a regular (LTE) radio bearer, without affecting ongoing encryption for already established regular LTE radio bearers. For example, certain embodiments maintain the common security algorithm negotiation for all bearers using Security Mode Command. Certain embodiments also allow modifications of the PDCP ciphering mode of the LWA and LTE radio bearers, if needed, because of UE mobility based on the security level of the new APs.

Similar information exchange could be applied to LTE-WLAN radio level integration via Ipsec tunneling (LWIP) as well, for which a Release 14 Work Item is expected to be approved targeting, among others, the removing of IPsec tunneling.

Certain embodiments of the present invention help to avoid double encryption that occurs in the UE, when a LWA feature is turned on. By avoiding double encryption, certain embodiments may significantly conserve UE battery power.

Figure 2:
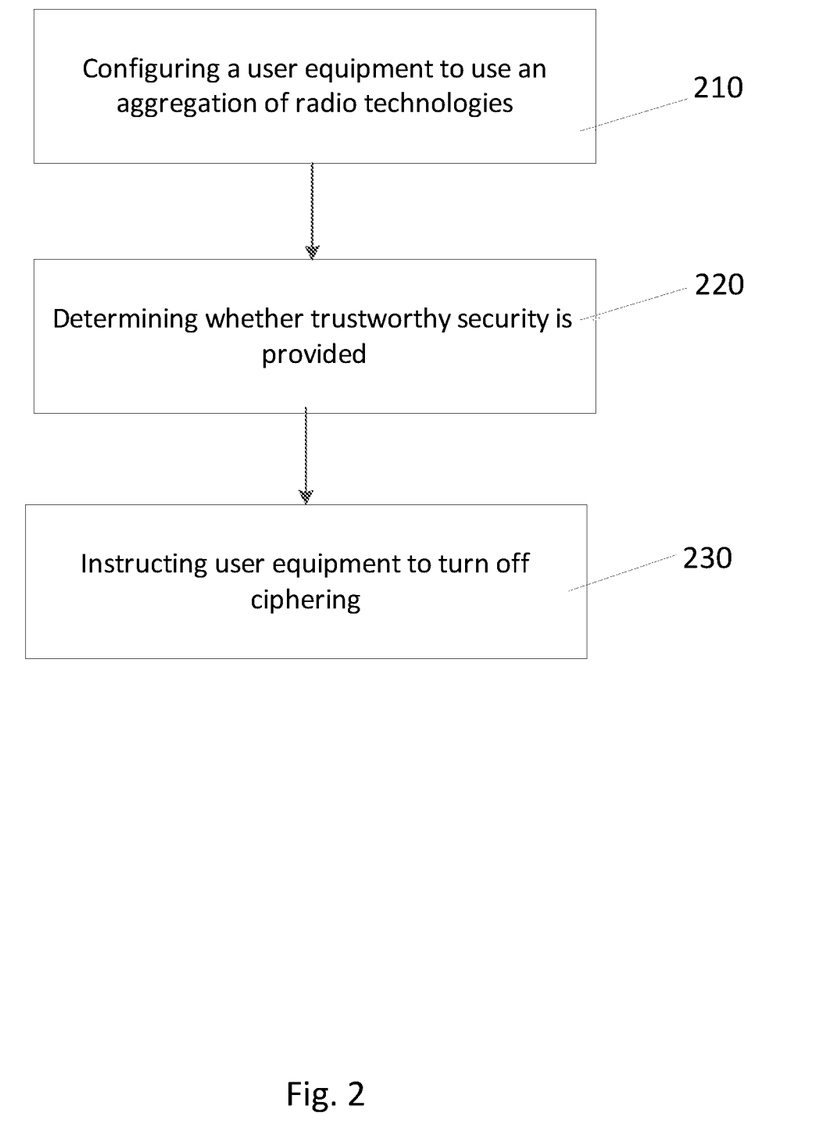
FIG. 2 illustrates a flowchart of a method in accordance with certain embodiments of the invention.

FIG. 2 illustrates a flowchart of another method in accordance with certain embodiments of the invention. The method illustrated in FIG. 2 includes, at 210, configuring, by a network node, a user equipment to use an aggregation of radio technologies. At least one radio bearer is established between the user equipment and the network node and is routed over an access point of an alternate wireless network. The method also includes, at 220, determining whether trustworthy security and equivalent security to LTE radio bearers is provided by the access point of the alternate wireless network. The method also includes, at 230, instructing the user equipment to turn off PDCP ciphering based on the determining. The PDCP ciphering is turned off for the at least one radio bearer between the user equipment and the network node. Ciphering may be turned off on the end to end link between the eNB and the UE. Between the UE and the AP, there is ciphering.

Figure 3:
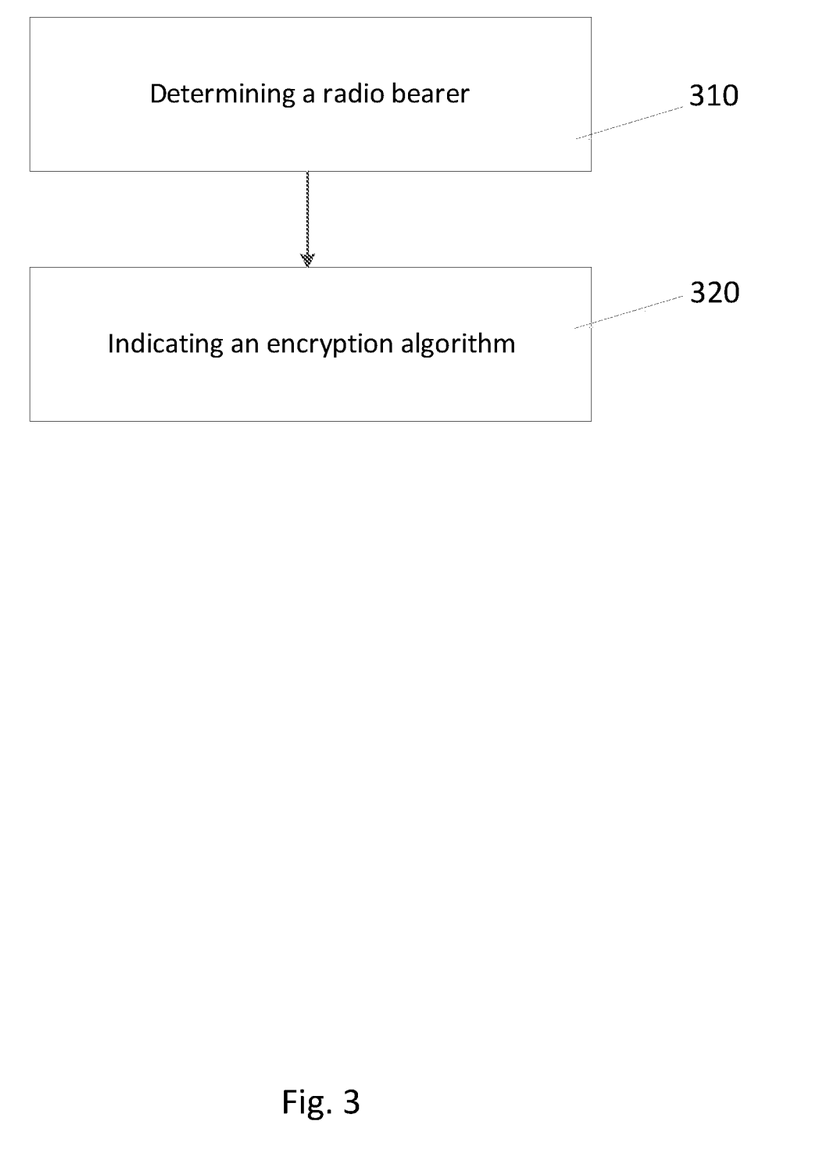
FIG. 3 illustrates a flowchart of another method in accordance with certain embodiments of the invention.

FIG. 3 illustrates a flowchart of another method in accordance with certain embodiments of the invention. The method illustrated in FIG. 3 includes, at 310, determining, by a network node, a radio bearer. The method also includes, at 320, indicating an encryption algorithm to the determined radio bearer. The indicating comprises instructing the determined radio bearer to use the indicated encryption algorithm, while continuing common security procedures for other radio bearers without change.

Figure 4:
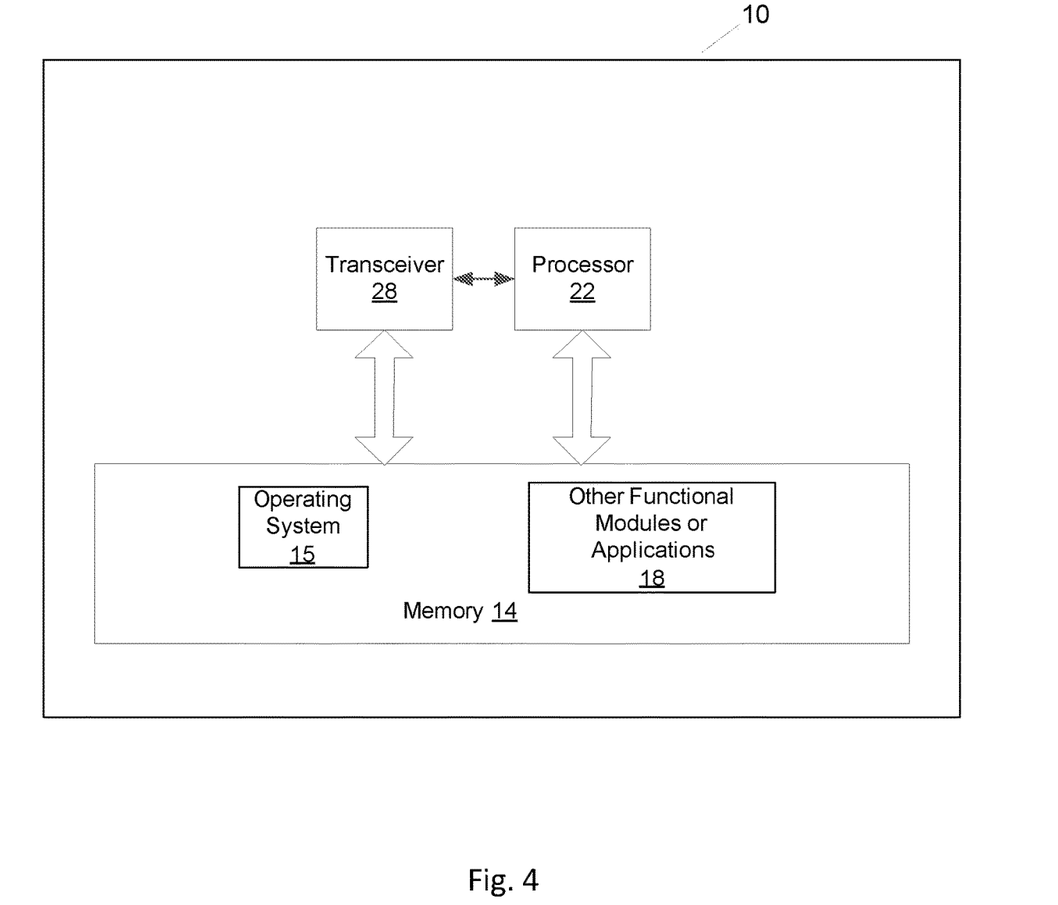
FIG. 4 illustrates an apparatus in accordance with certain embodiments of the invention.

FIG. 4 illustrates an apparatus 10 according to another embodiment. In an embodiment, apparatus 10 may be an end user device. In another embodiment, apparatus 10 may be an access point, base station, and/or an evolved Node B, for example.

Apparatus 10 includes a processor 22 for processing information and executing instructions or operations. Processor 22 may be any type of general or specific purpose processor. While a single processor 22 is shown in FIG. 4, multiple processors may be utilized according to other embodiments. In fact, processor 22 may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as examples.

Apparatus 10 further includes a memory 14, coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory ("RAM"), read only memory ("ROM"), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas (not shown) for transmitting and receiving signals and/or data to and from apparatus 10. Apparatus 10 may further include a transceiver 28 that modulates information on to a carrier waveform for transmission by the antenna(s) and demodulates information received via the antenna(s) for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include an operating system 15 that provides operating system functionality for apparatus 10. The memory may also store one or more functional modules 18, such as an application or program, to provide additional functionality for apparatus 10. The components of apparatus 10 may be implemented in hardware, or as any suitable combination of hardware and software.

With one embodiment, apparatus 10 can be configured to configure a user equipment to use an aggregation of radio technologies. At least one radio bearer is established between the user equipment and the apparatus and is routed over an access point of a wireless network. Apparatus 10 can also be configured to determine whether trustworthy security is provided by the access point of the alternate wireless network. Apparatus 10 can also be configured to instruct the user equipment to turn off ciphering based on the determining, wherein the ciphering is turned off for the at least one radio bearer between the user equipment and the apparatus.

With another embodiment, apparatus 10 can be configured to determine a radio bearer. Apparatus 10 can also be configured to indicate an encryption algorithm to the determined radio bearer, wherein the indicating comprises instructing the determined radio bearer to use the indicated encryption algorithm, while continuing security procedures for other radio bearers without change.

Figure 5:
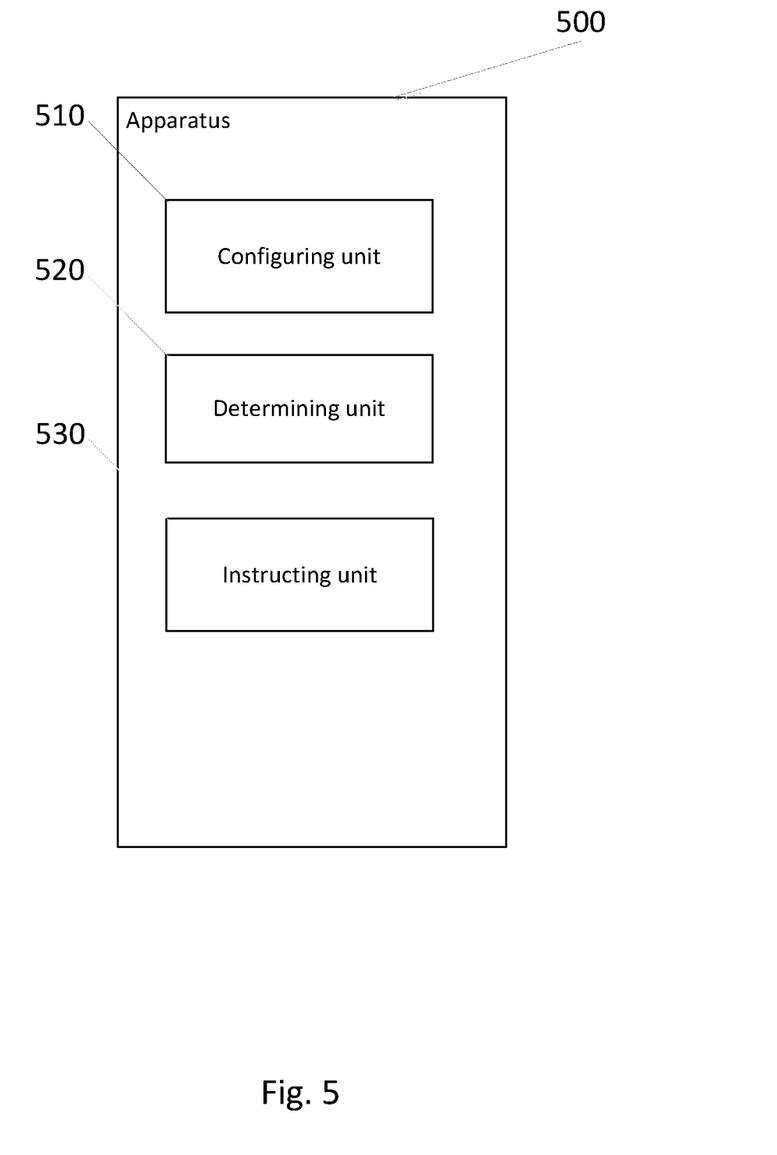
FIG. 5 illustrates another apparatus in accordance with certain embodiments of the invention.

FIG. 5 illustrates another apparatus in accordance with certain embodiments of the invention. Apparatus 500 can be an evolved Node B, for example. Apparatus 500 can include a configuring unit 510 that configures a user equipment to use an aggregation of radio technologies. At least one radio bearer is established between the user equipment and apparatus 500 and is routed over an access point of an alternate wireless network. Apparatus 500 can include a determining unit 520 that determines whether trustworthy security is provided by the access point of the alternate wireless network. Apparatus 500 can also include an instructing unit 530 that instructs the user equipment to turn off ciphering based on the determining. The ciphering is turned off for the at least one radio bearer between the user equipment and apparatus 500.

Figure 6:
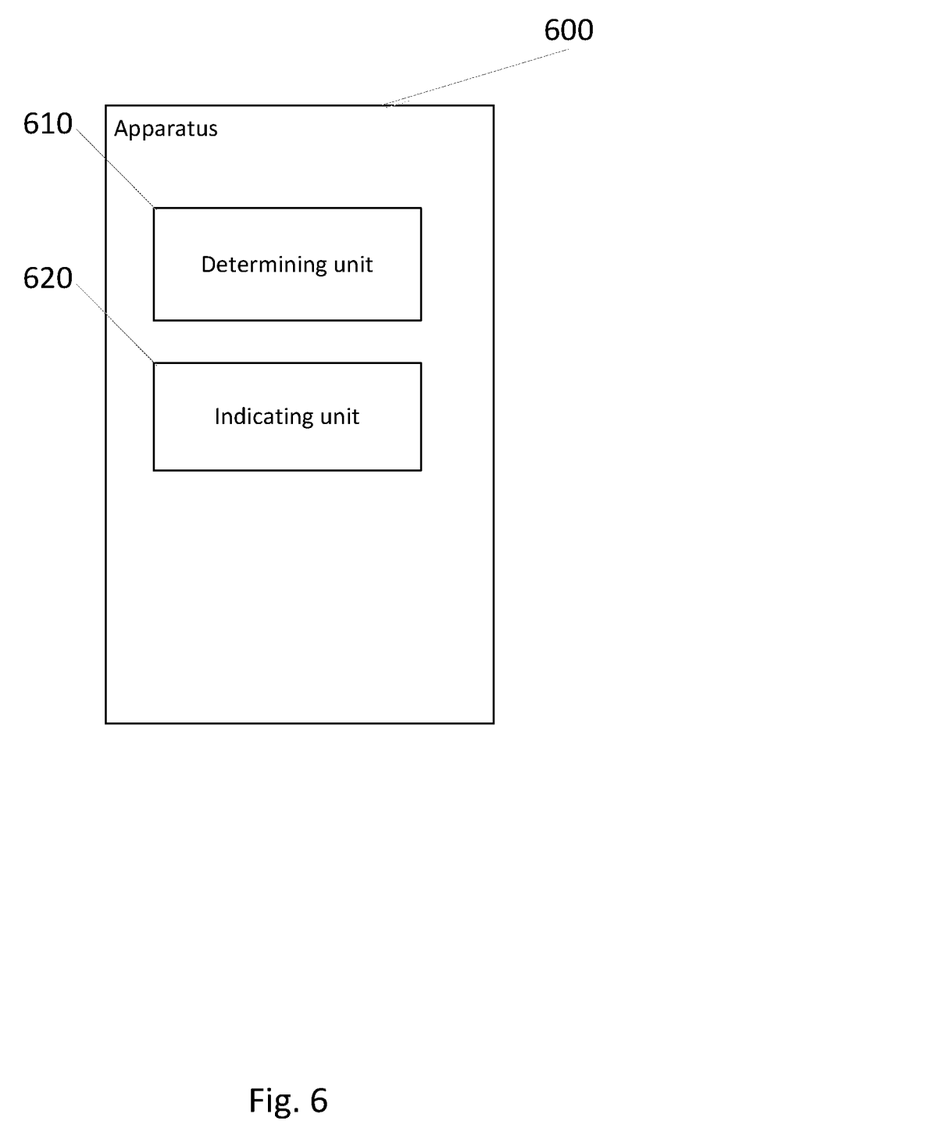
FIG. 6 illustrates another apparatus in accordance with certain embodiments of the invention.

FIG. 6 illustrates another apparatus in accordance with certain embodiments of the invention. Apparatus 600 can be an evolved Node B, for example. Apparatus 600 can include a determining unit 610 that determines a radio bearer. Apparatus 600 can also include an indicating unit 620 that indicates an encryption algorithm to the determined radio bearer. The indicating comprises instructing the determined radio bearer to use the indicated encryption algorithm, while continuing common security procedures for other radio bearers without change.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
   configuring, by a network node, a user equipment to use an aggregation of radio technologies, wherein at least one radio bearer is established between the user equipment and the network node and is routed over an access point of an alternate wireless network;
   determining whether trustworthy security is provided by the access point of the alternate wireless network, wherein the determining whether trustworthy security is provided by the access point comprises determining whether adequate ciphering corresponding to the ciphering of 3GPP is provided between the access point and the user equipment; and
   instructing the user equipment to turn off ciphering based on the determining, wherein the ciphering is turned off for the at least one radio bearer between the user equipment and the network node,
   wherein the instructing the user equipment to turn off ciphering comprises instructing the user equipment to turn off packet data convergence protocol ciphering when it is determined that the adequate ciphering is provided between the access point and the user equipment.

2. The method according to claim 1, wherein the network node comprises an evolved Node B.

3. The method according to claim 1, wherein the access point comprises an access point of a Wireless-Local Area-Network (WLAN) defined by IEEE802.11 series, a 5G radio access point defined by the 3GPP, and/or a Bluetooth radio point.

4. The method according to claim 1, wherein the determining whether trustworthy security is provided by the access point comprises determining whether adequate ciphering is provided between the access point and a WLAN termination.

5. The method according to claim 1, wherein instructing the user equipment to turn off ciphering comprises indicating a NULL encryption (EEA0) algorithm choice to the user equipment.

6. The method according to claim 1, wherein instructing the user equipment to turn off ciphering based on the determining comprises turning off ciphering for the at least one radio bearer or part of the at least one radio bearer, while continuing security procedures for other radio bearers without change.

7. The method according to claim 1, further comprising exchanging information regarding whether the access point is trustworthy, wherein the exchanged information indicates at least one of an identifier of the access point, an ownership of the access point, a type of access authentication of the access point, and an encryption used by the access point.

8. An apparatus, comprising:
   at least one processor; and
   at least one memory including computer program code, where the at least one memory and the computer program code are configured, with the at least one processor, to cause the apparatus to:
   configure a user equipment to use an aggregation of radio technologies, wherein at least one radio bearer is established between the user equipment and the apparatus and is routed over an access point of an alternate wireless network;
   determine whether trustworthy security is provided by the access point of the alternate wireless network, wherein the determining whether trustworthy security is provided by the access point comprises determining whether adequate ciphering corresponding to the ciphering of 3GPP is provided between the access point and the user equipment; and
   instruct the user equipment to turn off ciphering based on the determining, wherein the ciphering is turned off for the at least one radio bearer between the user equipment and the apparatus,
   wherein the instructing the user equipment to turn off ciphering comprises instructing the user equipment to turn off packet data convergence protocol ciphering.

9. The apparatus according to claim 8, wherein the apparatus comprises an evolved Node B.

10. The apparatus according to claim 8, wherein the access point comprises an access point of a Wireless-Local Area-Network (WLAN) defined by IEEE802.11 series, a 5G radio access point defined by the 3GPP, and/or a Bluetooth radio point.

11. The apparatus according to claim 8, wherein the determining whether trustworthy security is provided by the access point comprises determining whether adequate ciphering is provided between the access point and a WLAN termination.

12. The apparatus according to claim 8, wherein the instructing the user equipment to turn off ciphering comprises indicating an NULL encryption (EEA0) algorithm choice to the user equipment.

13. The apparatus according to claim 8, wherein the instructing the user equipment to turn off ciphering based on the determining comprises turning off ciphering for the at least one radio bearer or part of the at least one radio bearer, while continuing security procedures for other radio bearers without change.

14. The apparatus according to claim 8, wherein the at least one memory and the computer program code are configured, with the at least one processor, to cause the apparatus to exchange information regarding whether the access point is trustworthy, wherein the exchanged information indicates at least one of an identifier of the access point, an ownership of the access point, a type of access authentication of the access point, and an encryption used by the access point.

15. An apparatus, comprising:
   at least one processor; and
   at least one memory including computer program code, where the at least one memory and the computer program code are configured, with the at least one processor, to cause the apparatus to:
   determine a radio bearer; and
   indicate an encryption algorithm to the determined radio bearer, wherein the indicating comprises instructing the determined radio bearer to use the indicated encryption algorithm, while continuing common security procedures for other radio bearers without change.

* * * * *